United States Patent
Tian et al.

(10) Patent No.: US 9,906,391 B2
(45) Date of Patent: Feb. 27, 2018

(54) METHODS AND APPARATUS FOR PACKET ACQUISITION IN MIXED-RATE WIRELESS COMMUNICATION NETWORKS

(71) Applicant: QUALCOMM Incorporated, San Diego, CA (US)

(72) Inventors: Bin Tian, San Diego, CA (US); Tao Tian, San Diego, CA (US); Sameer Vermani, San Diego, CA (US); Eric Pierre Rebeiz, San Diego, CA (US); Dung Ngoc Doan, San Diego, CA (US); Lin Yang, San Diego, CA (US); Rahul Tandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 14/852,207

(22) Filed: Sep. 11, 2015

(65) Prior Publication Data
US 2016/0080973 A1 Mar. 17, 2016

Related U.S. Application Data

(60) Provisional application No. 62/051,171, filed on Sep. 16, 2014.

(51) Int. Cl.
*H04W 4/00* (2009.01)
*H04L 27/26* (2006.01)

(52) U.S. Cl.
CPC .................................. *H04L 27/261* (2013.01)

(58) Field of Classification Search
CPC .................................................. H04L 27/261
See application file for complete search history.

(56) References Cited

U.S. PATENT DOCUMENTS

| | | | |
|---|---|---|---|
| 7,639,600 B1* | 12/2009 | Lou | H04L 25/0204 370/208 |
| 2008/0089431 A1* | 4/2008 | Van De Beek | H04B 7/2615 375/260 |

(Continued)

OTHER PUBLICATIONS

Choi J., et al., "doc.: IEEE 11-14/0804r1 Envisioning 11ax PHY Structure—Part I Date: Jul. 14, 2014 Name Affiliations Address Phone email," Jul. 14, 2014 (Jul. 14, 2014), 11 pages; XP055229337, Retrieved from the Internet: URL:https://mentor. ieee.org/802.11/dcn/14/11-14-0804-01-00ax-envisioning-11ax-phy-st ructure-part-i.pptx [retrieved on Nov. 18, 2015].

(Continued)

*Primary Examiner* — Robert Wilson
(74) *Attorney, Agent, or Firm* — Knobbe, Martens, Olson & Bear LLP

(57) ABSTRACT

A method of wirelessly communicating a packet including a first portion for transmission over at least one channel of a first transmission type and a second portion for transmission over at least one channel of a second transmission type. In one aspect, the method includes generating, at a wireless device, a packet including a first portion having a first symbol duration. The packet further includes a second portion having a second symbol duration greater than the first. The second portion can include a plurality of repeated portions of the signal field, the repeated portions having the second symbol duration. The first portion includes a first training field. The method further includes prepending or appending a second training field to the first portion. The second training field has the second symbol duration. The method further includes transmitting the packet.

35 Claims, 12 Drawing Sheets

(56) References Cited

U.S. PATENT DOCUMENTS

| | | | | |
|---|---|---|---|---|
| 2008/0130715 A1* | 6/2008 | Gorday | ............ | H04B 1/707 375/146 |
| 2009/0135922 A1* | 5/2009 | Kang | ............ | H04L 5/0007 375/260 |
| 2012/0207231 A1 | 8/2012 | Zhang et al. | | |
| 2015/0326408 A1* | 11/2015 | Vermani | ............ | H04L 1/0625 370/328 |
| 2016/0073379 A1* | 3/2016 | Yang | ............ | H04W 28/20 370/329 |

OTHER PUBLICATIONS

International Search Report and Written Opinion—PCT/US2015/050013—ISA/EPO—Nov. 26, 2015.

\* cited by examiner

METHODS AND APPARATUS FOR PACKET ACQUISITION IN MIXED-RATE WIRELESS COMMUNICATION NETWORKS

PRIORITY CLAIM

This application claims the benefit of U.S. Provisional Application No. 62/051,171, filed Sep. 16, 2014, which is hereby incorporated herein by reference in its entirety.

FIELD

Certain aspects of the present disclosure generally relate to wireless communications, and more particularly, to methods and apparatus for mixed-rate communication in a wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

As the volume and complexity of information communicated wirelessly between multiple devices continues to increase, overhead bandwidth required for physical layer control signals continues to increase at least linearly. The number of bits utilized to convey physical layer control information has become a significant portion of required overhead. Thus, with limited communication resources, it is desirable to reduce the number of bits required to convey this physical layer control information, especially as multiple types of traffic are concurrently sent from an access point to multiple terminals. For example, when a wireless device sends low-rate uplink communications to an access point, it is desirable to minimize the number of bits used for signaling and packet acquisition while maintaining backwards compatibility. Thus, there is a need for an improved protocol for mixed-rate transmissions.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages can become apparent from the description, the drawings, and the claims. Note that the relative dimensions of the following figures may not be drawn to scale.

One aspect of the present disclosure provides a method of wireless communication. The method includes generating, at a wireless device, a packet including a first portion having a first symbol duration. The packet further includes a second portion having a second symbol duration greater than the first. The first portion includes a first training field. The method further includes prepending or appending a second training field to the first portion. The second training field has the second symbol duration. The method further includes transmitting the packet.

In various embodiments, said prepending or appending can include prepending the second training field to the first portion. The second training field can have a periodicity different than a periodicity of the first training field. In various embodiments, the method can further include inverting a sign of one or more samples of every other multiple of periodicity for the second training field. In various embodiments, the second training field can have a periodicity at least two times the periodicity of the first training field.

In various embodiments, the packet can further include a signal field after the first portion, the signal field having the second symbol duration. In various embodiments, the packet can further include a one or more symbols after the first portion. The symbols can have the first symbol duration.

In various embodiments, the first portion can include a signal field. The second portion can include a plurality of repeated portions of the signal field. The repeated portions can have the second symbol duration.

In various embodiments, n repeated portions of the signal field can each include a subset of carrier tones of the signal field. In various embodiments, said prepending or appending can include appending one or more symbols having the first symbol duration to the first portion, boosting a gain of the second training field, and appending the second training field to the one or more symbols.

In various embodiments, the packet can include a scheduled multi-user (MU) orthogonal frequency division multiple access (OFDMA) uplink (UL) packet. In various embodiments, the packet initiates an unscheduled single-user (SU) orthogonal frequency division multiple access (OFDMA) uplink (UL) packet.

Another aspect provides an apparatus of wireless communication. The apparatus includes a processor configured to generate a packet including a first portion having a first symbol duration. The packet further includes a second portion having a second symbol duration greater than the first. The first portion includes a first training field. The processor is further configured to prepend or append a second training field to the first portion. The second training field has the second symbol duration. The apparatus further includes a transmitter configured to transmit the packet.

In various embodiments, the processor can be configured to prepend the second training field to the first portion. The second training field can have a periodicity different than a periodicity of the first training field. In various embodiments, the processor can be further configured to invert a sign of one or more samples of every other multiple of periodicity for the second training field. In various embodiments, the second training field can have a periodicity at least two times the periodicity of the first training field.

In various embodiments, the packet can further include a signal field after the first portion. The signal field can have the second symbol duration. In various embodiments, the packet can further include a one or more symbols after the first portion. The symbols can have the first symbol duration.

In various embodiments, the first portion can include a signal field. The second portion can include a plurality of repeated portions of the signal field. The repeated portions can have the second symbol duration.

In various embodiments, n repeated portions of the signal field can each include a subset of carrier tones of the signal field. In various embodiments, the processor can be configured to append one or more symbols having the first symbol duration to the first portion, boost a gain of the second training field, and append the second training field to the one or more symbols.

In various embodiments, the packet can include a scheduled multi-user (MU) orthogonal frequency division multiple access (OFDMA) uplink (UL) packet. In various embodiments, the packet initiates an unscheduled single-user (SU) orthogonal frequency division multiple access (OFDMA) uplink (UL) packet.

Another aspect provides an apparatus of wireless communication. The apparatus includes means for generating a packet including a first portion having a first symbol duration. The packet further includes a second portion having a second symbol duration greater than the first. The first portion includes a first training field. The apparatus further includes means for prepending or appending a second training field to the first portion. The second training field has the second symbol duration. The apparatus further includes means for transmitting the packet.

In various embodiments, said means for prepending or appending can include means for prepending the second training field to the first portion. The second training field has a periodicity different than a periodicity of the first training field. In various embodiments, the apparatus can further include means for inverting a sign of one or more samples of every other multiple of periodicity for the second training field. In various embodiments, the second training field can have a periodicity at least two times the periodicity of the first training field.

In various embodiments, the packet can further include a signal field after the first portion. The signal field can have the second symbol duration. In various embodiments, the packet can further include a one or more symbols after the first portion. The symbols can have the first symbol duration.

In various embodiments, the first portion can include a signal field. The second portion can include a plurality of repeated portions of the signal field. The repeated portions can have the second symbol duration.

In various embodiments, n repeated portions of the signal field can each include a subset of carrier tones of the signal field. In various embodiments, said means for prepending or appending can include means for appending one or more symbols having the first symbol duration to the first portion, means for boosting a gain of the second training field, and means for appending the second training field to the one or more symbols.

In various embodiments, the packet can include a scheduled multi-user (MU) orthogonal frequency division multiple access (OFDMA) uplink (UL) packet. In various embodiments, the packet initiates an unscheduled single-user (SU) orthogonal frequency division multiple access (OFDMA) uplink (UL) packet.

Another aspect provides a non-transitory computer-readable medium. The medium includes code that, when executed, causes an apparatus to generate a packet including a first portion having a first symbol duration. The packet further includes a second portion having a second symbol duration greater than the first. The first portion includes a first training field. The medium further includes code that, when executed, causes the apparatus to prepend or append a second training field to the first portion. The second training field has the second symbol duration. The medium further includes code that, when executed, causes the apparatus to transmit the packet.

In various embodiments, said prepending or appending can include prepending the second training field to the first portion. The second training field can have a periodicity different than a periodicity of the first training field. In various embodiments, the medium can further include code that, when executed, causes the apparatus to invert a sign of one or more samples of every other multiple of periodicity for the second training field. In various embodiments, the second training field can have a periodicity at least two times the periodicity of the first training field.

In various embodiments, the packet can further include a signal field after the first portion. The signal field can have the second symbol duration. In various embodiments, the packet can further include a one or more symbols after the first portion. The symbols can have the first symbol duration.

In various embodiments, the first portion can include a signal field. The second portion can include a plurality of repeated portions of the signal field. The repeated portions can have the second symbol duration.

In various embodiments, n repeated portions of the signal field each comprise a subset of carrier tones of the signal field. In various embodiments, said prepending or appending can include appending one or more symbols having the first symbol duration to the first portion, boosting a gain of the second training field, and appending the second training field to the one or more symbols.

In various embodiments, the packet can include a scheduled multi-user (MU) orthogonal frequency division multiple access (OFDMA) uplink (UL) packet. In various embodiments, the packet initiates an unscheduled single-user (SU) orthogonal frequency division multiple access (OFDMA) uplink (UL) packet.

DETAILED DESCRIPTION

Figure 1:
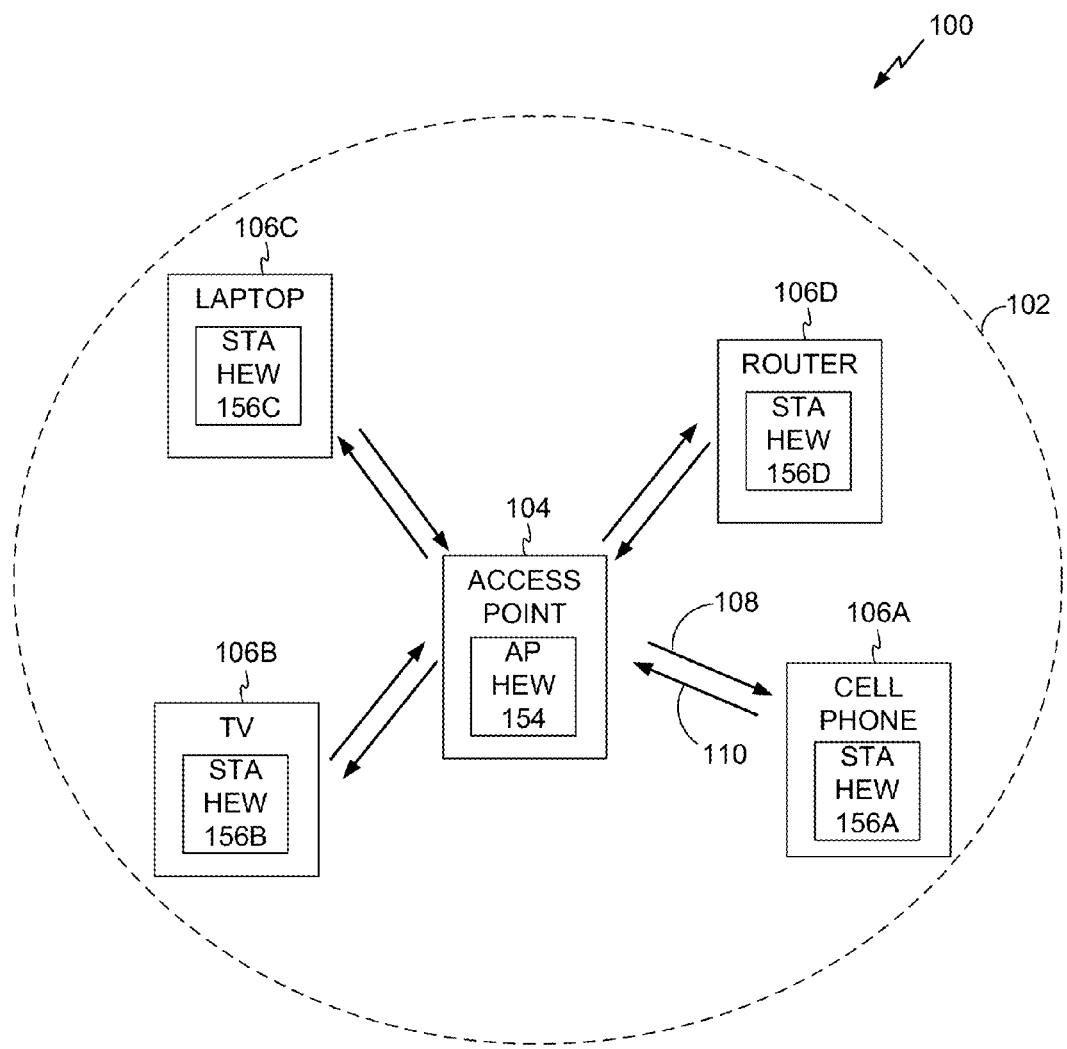
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosed can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as WiFi or, more generally, any member of the IEEE 802.11 family of wireless protocols. For example, the various aspects described herein can be used as part of an IEEE 802.11 protocol, such as an 802.11 protocol which supports orthogonal frequency-division multiple access (OFDMA) communications.

It can be beneficial to allow multiple devices, such as STAs, to communicate with an AP at the same time. For example, this can allow multiple STAs to receive a response from the AP in less time, and to be able to transmit and receive data from the AP with less delay. This can also allow an AP to communicate with a larger number of devices overall, and can also make bandwidth usage more efficient. By using multiple access communications, the AP can be able to multiplex OFDM symbols to, for example, four devices at once over an 80 MHz bandwidth, where each device utilizes 20 MHz bandwidth. Thus, multiple access can be beneficial in some aspects, as it can allow the AP to make more efficient use of the spectrum available to it.

It has been proposed to implement such multiple access protocols in an OFDM system such as the 802.11 family by assigning different subcarriers (or tones) of symbols transmitted between the AP and the STAs to different STAs. In this way, an AP could communicate with multiple STAs with a single transmitted OFDM symbol, where different tones of the symbol were decoded and processed by different STAs, thus allowing simultaneous data transfer to multiple STAs. These systems are sometimes referred to as OFDMA systems.

Such a tone allocation scheme is referred to herein as a "high-efficiency" (HE) system, and data packets transmitted in such a multiple tone allocation system can be referred to as high-efficiency (HE) packets. Various structures of such packets, including backward compatible preamble fields are described in detail below.

Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby devices together, employing widely used networking protocols. The various aspects described herein can apply to any communication standard, such as a wireless protocol.

In some aspects, wireless signals can be transmitted according to an 802.11 protocol. In some implementations, a WLAN includes various devices which are the components that access the wireless network. For example, there can be two types of devices: access points (APs) and clients (also referred to as stations, or STAs). In general, an AP can serve as a hub or base station for the WLAN and an STA serves as a user of the WLAN. For example, an STA can be a laptop computer, a personal digital assistant (PDA), a mobile phone, etc. In an example, an STA connects to an AP via a WiFi compliant wireless link to obtain general connectivity to the Internet or to other wide area networks. In some implementations an STA can also be used as an AP.

An access point (AP) can also include, be implemented as, or known as a base station, wireless access point, access node or similar terminology.

A station "STA" can also include, be implemented as, or known as an access terminal (AT), a subscriber station, a subscriber unit, a mobile station, a remote station, a remote terminal, a user terminal, a user agent, a user device, user equipment, or some other terminology. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured for network communication via a wireless medium.

As discussed above, certain of the devices described herein can implement an 802.11 standard, for example. Such devices, whether used as an STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

FIG. 1 illustrates an example of a wireless communication system 100 in which aspects of the present disclosure can be employed. The wireless communication system 100 can operate pursuant to a wireless standard, for example at least one of the 802.11ah, 802.11ac, 802.11n, 802.11g and 802.11b standards. The wireless communication system 100 can operate pursuant to a high-efficiency wireless standard, for example the 802.11ax standard. The wireless communication system 100 can include an AP 104, which communicates with STAs 106A-106D (which can be generically referred to herein as STA(s) 106).

A variety of processes and methods can be used for transmissions in the wireless communication system 100 between the AP 104 and the STAs 106A-106D. For example, signals can be sent and received between the AP 104 and the STAs 106A-106D in accordance with OFDM/OFDMA techniques. If this is the case, the wireless communication system 100 can be referred to as an OFDM/OFDMA system. Alternatively, signals can be sent and received between the AP 104 and the STAs 106A-106D in accordance with code division multiple access (CDMA) techniques. If this is the case, the wireless communication system 100 can be referred to as a CDMA system.

A communication link that facilitates transmission from the AP 104 to one or more of the STAs 106A-106D can be referred to as a downlink (DL) 108, and a communication link that facilitates transmission from one or more of the STAs 106A-106D to the AP 104 can be referred to as an uplink (UL) 110. Alternatively, a downlink 108 can be referred to as a forward link or a forward channel, and an uplink 110 can be referred to as a reverse link or a reverse channel.

The AP 104 can act as a base station and provide wireless communication coverage in a basic service area (BSA) 102. The AP 104 along with the STAs 106A-106D associated with the AP 104 and that use the AP 104 for communication can be referred to as a basic service set (BSS). It can be noted that the wireless communication system 100 may not have a central AP 104, but rather can function as a peer-to-peer network between the STAs 106A-106D. Accordingly, the functions of the AP 104 described herein can alternatively be performed by one or more of the STAs 106A-106D.

In some aspects, a STA 106 can be required to associate with the AP 104 in order to send communications to and/or receive communications from the AP 104. In one aspect, information for associating is included in a broadcast by the AP 104. To receive such a broadcast, the STA 106 can, for example, perform a broad coverage search over a coverage region. A search can also be performed by the STA 106 by sweeping a coverage region in a lighthouse fashion, for example. After receiving the information for associating, the STA 106 can transmit a reference signal, such as an association probe or request, to the AP 104. In some aspects, the AP 104 can use backhaul services, for example, to communicate with a larger network, such as the Internet or a public switched telephone network (PSTN).

In an embodiment, the AP 104 includes an AP high efficiency wireless controller (HEW) 154. The AP HEW 154 can perform some or all of the operations described herein to enable communications between the AP 104 and the STAs 106A-106D using the 802.11 protocol. The functionality of the AP HEW 154 is described in greater detail below with respect to FIGS. 4-20.

Alternatively or in addition, the STAs 106A-106D can include a STA HEW 156. The STA HEW 156 can perform some or all of the operations described herein to enable communications between the STAs 106A-106D and the AP 104 using the 802.11 protocol. The functionality of the STA HEW 156 is described in greater detail below with respect to FIGS. 2-11.

Figure 2:
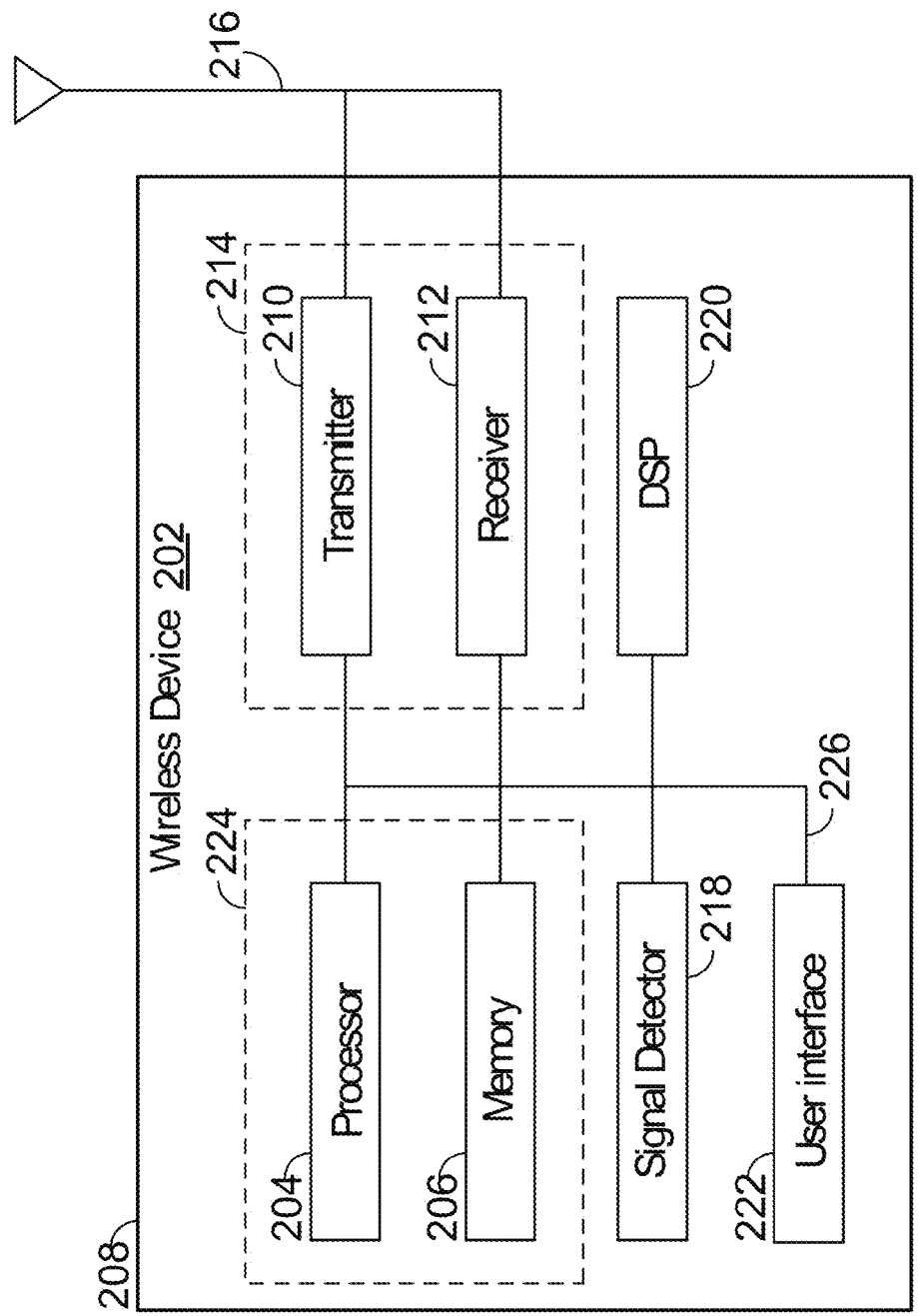
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100 of FIG. 1. The wireless device 202 is an example of a device that can be configured to implement the various methods described herein. For example, the wireless device 202 can include the AP 104 or one of the STAs 106A-106D.

The wireless device 202 can include a processor 204 which controls operation of the wireless device 202. The processor 204 can also be referred to as a central processing unit (CPU) or hardware processor. Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processor 204 or the processor 204 and the memory 206 can correspond to the packet generator 124 of FIG. 1, which can be utilized to generate a packet including a value in a packet type field and to allocate a plurality of bits of the packet to each of a plurality of subsequent fields based at least in part on the value in the packet type field, as can be described in more detail below.

The processing system can also include non-transitory machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during multiple-input multiple-output (MIMO) communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can include a physical layer data unit (PPDU). In some aspects, the PPDU is referred to as a packet.

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art can appreciate the components of the wireless device 202 can be coupled together or accept or provide inputs to each other using some other mechanism.

Although a number of separate components are illustrated in FIG. 2, those of skill in the art can recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can include the AP 104 or one of the STAs 106A-106D, and can be used to transmit and/or receive communications. The communications exchanged between devices in a wireless network can include data units which can include packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Figure 3:
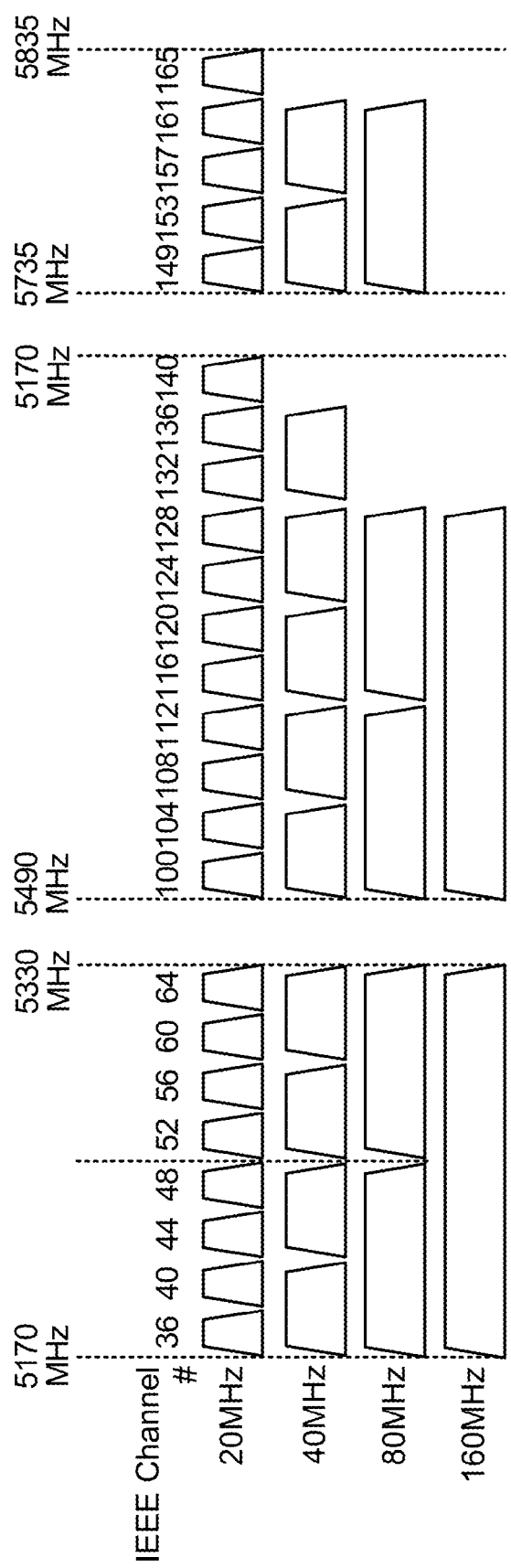
FIG. 3 illustrates a channel allocation for channels available for 802.11 systems.

FIG. 3 illustrates a channel allocation for channels available for 802.11 systems. Various IEEE 802.11 systems support a number of different sizes of channels, such as 5, 10, 20, 40, 80, and 160 MHz channels. For example, and 802.11ac device can support 20, 40, and 80 MHz channel bandwidth reception and transmission. A larger channel can include two adjacent smaller channels. For example, an 80 MHz channel can include two adjacent 40 MHz channels. In the currently implemented IEEE 802.11 systems, a 20 MHz channel contains 64 subcarriers, separated from each other by 312.5 kHz. Of these subcarriers, a smaller number can be used for carrying data. For example, a 20 MHz channel can contain transmitting subcarriers numbered −1 to −28 and 1 to 28, or 56 subcarriers. Some of these carriers can also be used to transmit pilot signals.

Figure 4:
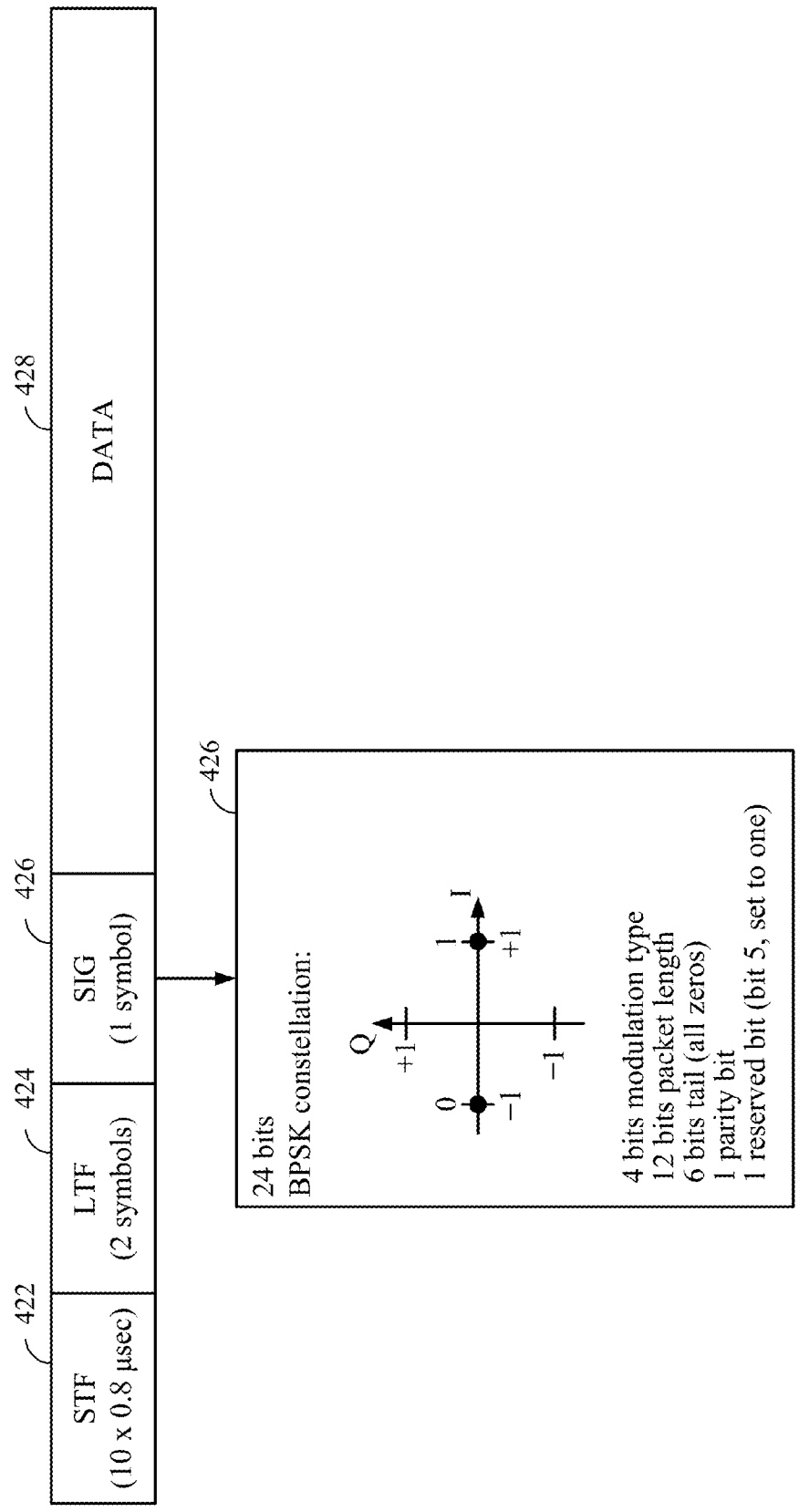
FIGS. 4 and 5 illustrate data packet formats for several currently existing IEEE 802.11 standards.
Figure 5:
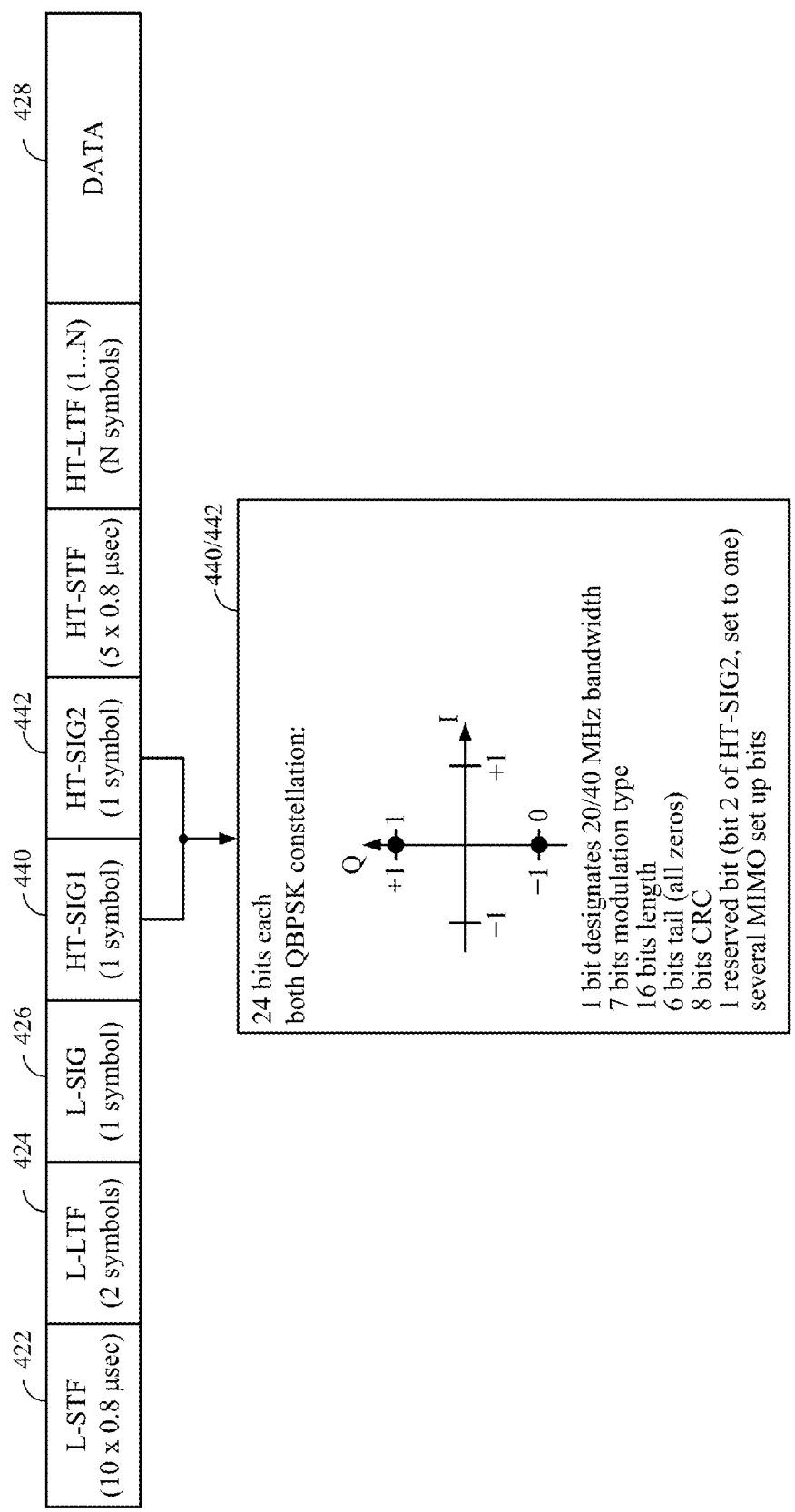

FIGS. 4 and 5 illustrate data packet formats for several currently existing IEEE 802.11 standards. Turning first to FIG. 4, a packet format for IEEE 802.11a, 11b, and 11g is illustrated. This frame includes a short training field 422, a long training field 424, and a signal field 426. The training fields do not transmit data, but they allow synchronization between the AP and the receiving STAs for decoding the data in the data field 428.

The signal field 426 delivers information from the AP to the STAs about the nature of the packet being delivered. In IEEE 802.11a/b/g devices, this signal field has a length of 24 bits, and is transmitted as a single OFDM symbol at a 6 Mb/s rate using BPSK modulation and a code rate of ½. The information in the SIG field 426 includes 4 bits describing the modulation scheme of the data in the packet (e.g., BPSK, 16 QAM, 64 QAM, etc.), and 12 bits for the packet length. This information is used by a STA to decode the data in the packet when the packet is intended for the STA. When a packet is not intended for a particular STA, the STA can defer any communication attempts during the time period defined in the length field of the SIG symbol 426, and can, to save power, enter a sleep mode during the packet period of up to about 5.5 msec.

As features have been added to IEEE 802.11, changes to the format of the SIG fields in data packets were developed to provide additional information to STAs. FIG. 5 shows the packet structure for the IEEE 802.11n packet. The 11n addition to the IEEE.802.11 standard added MIMO functionality to IEEE.802.11 compatible devices. To provide backward compatibility for systems containing both IEEE 802.11a/b/g devices and IEEE 802.11n devices, the data packet for IEEE 802.11n systems also includes the STF, LTF, and SIG fields of these earlier systems, noted as L-STF 422, L-LTF 424, and L-SIG 426 with a prefix L to denote that they are "legacy" fields. To provide the needed information to STAs in an IEEE 802.11n environment, two additional signal symbols 440 and 442 were added to the IEEE 802.11n data packet. In contrast with the SIG field and L-SIG field 426, however, these signal fields used rotated BPSK modulation (also referred to as QBPSK modulation). When a legacy device configured to operate with IEEE 802.11a/b/g receives such a packet, it can receive and decode the L-SIG field 426 as a normal 11/b/g packet. However, as the device continued decoding additional bits, they may not be decoded successfully because the format of the data packet after the L-SIG field 426 is different from the format of an 11/b/g packet, and the CRC check performed by the device during this process can fail. This causes these legacy devices to stop processing the packet, but still defer any further operations until a time period has passed defined by the length field in the initially decoded L-SIG. In contrast, new devices compatible with IEEE 802.11n would sense the rotated modulation in the HT-SIG fields, and process the packet as an 802.11n packet. Furthermore, an 11n device can tell that a packet is intended for an 11/b/g device because if it senses any modulation other than QBPSK in the symbol following the L-SIG 426, it can ignore it as an 11/b/g packet. After the HT-SIG1 and SIG2 symbols, additional training fields suitable for MIMO communication are provided, followed by the data 428.

Figure 6:
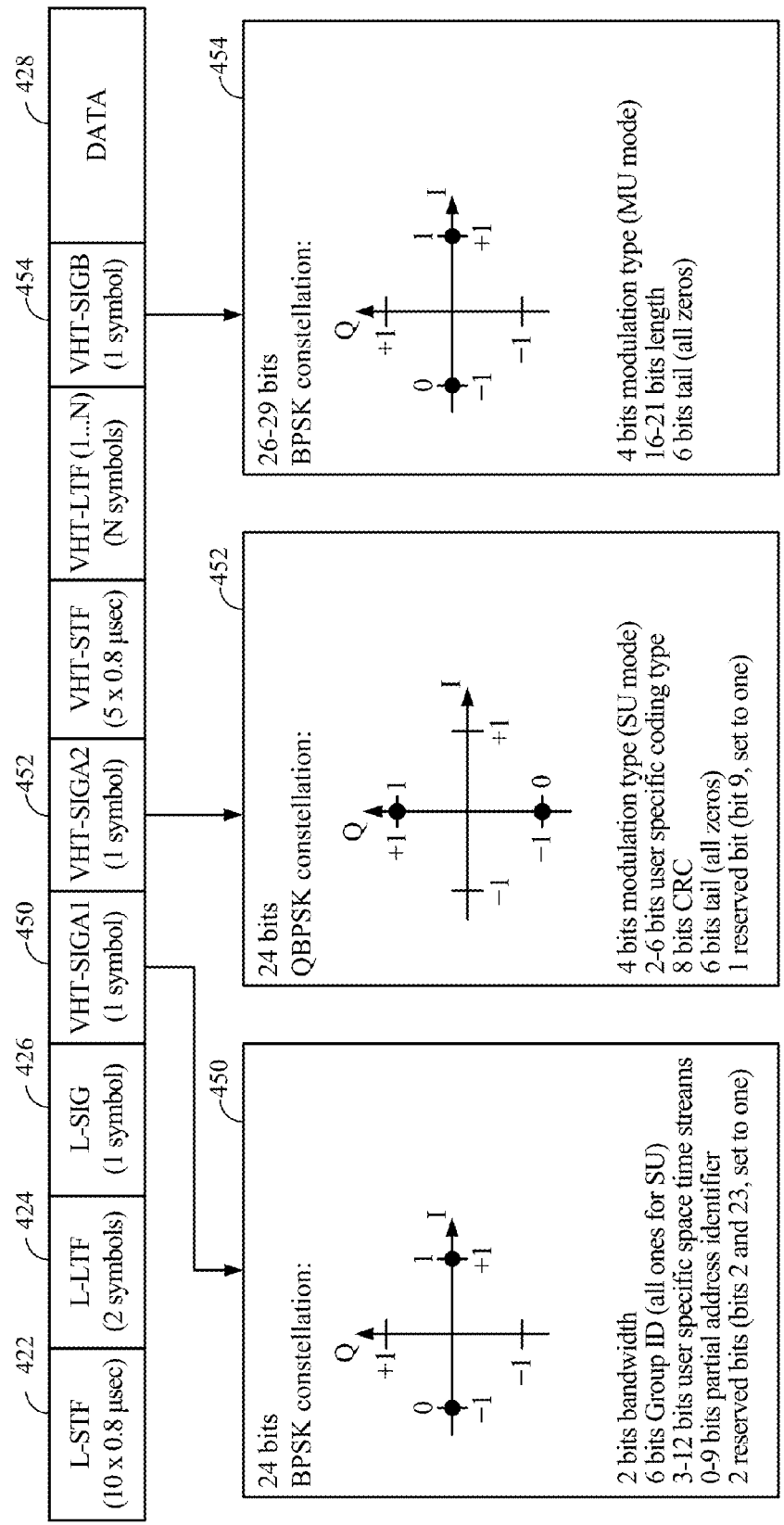
FIG. 6 illustrates a frame format for the currently existing IEEE 802.11ac standard.

FIG. 6 illustrates a frame format for the currently existing IEEE 802.11ac standard, which added multi-user MIMO functionality to the IEEE 802.11 family. Similar to IEEE 802.11n, an 802.11ac frame contains the same legacy short training field (L-STF) 422 and long training field (L-LTF) 424. An 802.11ac frame also contains a legacy signal field L-SIG 426 as described above.

Next, an 802.11ac frame includes a Very High Throughput Signal (VHT-SIG-A1 450 and A2 452) field two symbols in length. This signal field provides additional configuration information related to 11ac features that are not present in 11/b/g and 11n devices. The first OFDM symbol 450 of the VHT-SIG-A can be modulated using BPSK, so that any 802.11n device listening to the packet can believe the packet to be an 802.11a packet, and can defer to the packet for the duration of the packet length as defined in the length field of the L-SIG 426. Devices configured according to 11/g can be expecting a service field and MAC header following the L-SIG 426 field. When they attempt to decode this, a CRC failure can occur in a manner similar to the procedure when an 11n packet is received by an 11a/b/g device, and the 11/b/g devices can also defer for the period defined in the L-SIG field 426. The second symbol 452 of the VHT-SIG-A is modulated with a 90-degree rotated BPSK. This rotated second symbol allows an 802.11ac device to identify the packet as an 802.11ac packet. The VHT-SIGA1 450 and A2 452 fields contain information on a bandwidth mode, modulation and coding scheme (MCS) for the single user case, number of space time streams (NSTS), and other information. The VHT-SIGA1 450 and A2 452 can also contain a number of reserved bits that are set to "1." The legacy fields and the VHT-SIGA1 and A2 fields can be duplicated over each 20 MHz of the available bandwidth. Although duplication may be constructed to mean making or being an exact copy, certain differences may exist when fields, etc. are duplicated as described herein.

After the VHT-SIG-A, an 802.11ac packet can contain a VHT-STF, which is configured to improve automatic gain control estimation in a multiple-input and multiple-output (MIMO) transmission. The next 1 to 8 fields of an 802.11ac packet can be VHT-LTFs. These can be used for estimating the MIMO channel and then equalizing the received signal. The number of VHT-LTFs sent can be greater than or equal to the number of spatial streams per user. Finally, the last field in the preamble before the data field is the VHT-SIG-B 454. This field is BPSK modulated, and provides information on the length of the useful data in the packet and, in the case of a multiple user (MU) MIMO packet, provides the MCS. In a single user (SU) case, this MCS information is instead contained in the VHT-SIGA2. Following the VHT-SIG-B, the data symbols are transmitted Although 802.11ac introduced a variety of new features to the 802.11 family, and included a data packet with preamble design that was backward compatible with 11/g/n devices and also provided information necessary for implementing the new features of 11ac, configuration information for OFDMA tone allocation for multiple access is not provided by the 11ac data packet design. New preamble configurations are desired to implement such features in any future version of IEEE 802.11 or any other wireless network protocol using OFDM subcarriers.

Figure 7:
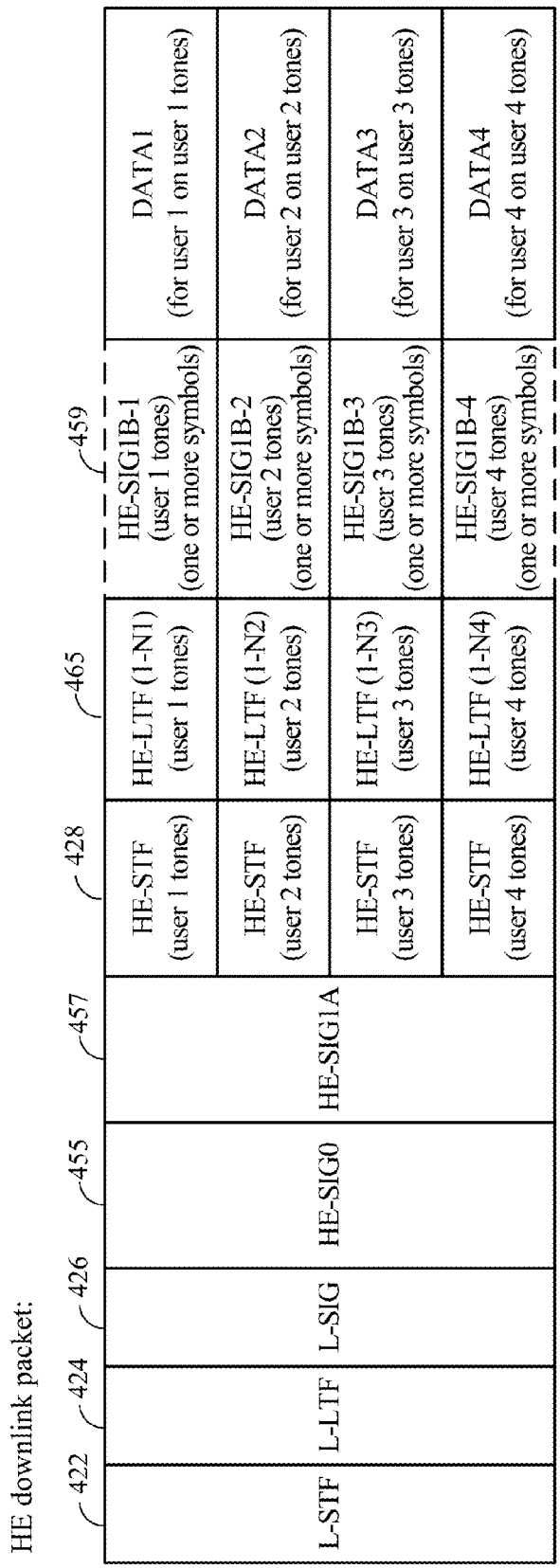
FIG. 7 illustrates an exemplary structure of a physical-layer packet which can be used to enable backward-compatible multiple access wireless communications.

FIG. 7 illustrates an exemplary structure of a physical-layer packet which can be used to enable backward-compatible multiple access wireless communications. In this example physical-layer packet, a legacy preamble including the L-STF 422, L-LTF 426, and L-SIG 426 are included. In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. A person having ordinary skill in the art can appreciate that the illustrated physical-layer packet can include additional fields, fields can be rearranged, removed, and/or resized, and the contents of the fields varied.

This packet also contains an HE-SIG0 symbol 455, and one or more HE-SIG1A symbols 457 (which can be variable in length), and an optional HE-SIG1B symbol 459 (which can be analogous to the VHT-SIG1B field 454 of FIG. 4). In various embodiments, the structure of these fields can be backward compatible with IEEE 802.11a/b/g/n/ac devices, and can also signal OFDMA HE devices that the packet is an HE packet. To be backward compatible with IEEE 802.11a/b/g/n/ac devices, appropriate modulation can be used on each of these symbols. In some implementations, the HE-SIG0 field 455 can be modulated with BPSK modulation. This can have the same effect on 802.11a/b/g/n devices as is currently the case with 802.11ac packets that also have their first SIG symbol BPSK modulated. For these devices, it does not matter what the modulation is on the subsequent HE-SIG symbols 457. In various embodiments, the HE-SIG0 field 455 can be modulated and repeated across multiple channels.

In various embodiments, the HE-SIG1A field 457 can be BPSK or QBPSK modulated. If BPSK modulated, an 11ac device can assume the packet is an 802.11a/b/g packet, and can stop processing the packet, and can defer for the time defined by the length field of L-SIG 426. If QBPSK modulated, an 802.11ac device can produce a CRC error during preamble processing, and can also stop processing the packet, and can defer for the time defined by the length field of L-SIG. To signal HE devices that this is an HE packet, at least the first symbol of HE-SIG1A 457 can be QBPSK modulated.

The information necessary to establish an OFDMA multiple access communication can be placed in the HE-SIG fields 455, 457, and 459 in a variety of positions. In various embodiments, the HE-SIG0 455 can include one or more of: a duration indication, a bandwidth indication (which can be, for example, 2 bits), a BSS color ID (which can be, for example, 3 bits), an UL/DL indication (which can be, for example, a 1-bit flag), a cyclic redundancy check (CRC) (which can be, for example, 4 bits), and a clear channel assessment (CCA) indication (which can be, for example, 2 bits).

In various embodiments, the HE-SIG1 field 457 can include a tone allocation information for OFDMA operation. The example of FIG. 7 can allow four different users to be each assigned a specific sub-band of tones and a specific number of MIMO space time streams. In various embodiments, 12 bits of space time stream information allows three bits for each of four users such that 1-8 streams can be assigned to each one. 16 bits of modulation type data allows four bits for each of four users, allowing assignment of any one of 16 different modulation schemes (16 QAM, 64 QAM, etc.) to each of four users. 12 bits of tone allocation data allows specific sub-bands to be assigned to each of four users.

One example SIG field scheme for sub-band (also referred to herein as sub-channel) allocation includes a 6-bit Group ID field as well as 10 bits of information to allocate sub-band tones to each of four users. The bandwidth used to deliver a packet can be allocated to STAs in multiples of some number of MHz. For example, the bandwidth can be allocated to STAs in multiples of B MHz. The value of B can be a value such as 1, 2, 5, 10, 15, or 20 MHz. The values of B can be provided by a two bit allocation granularity field. For example, the HE-SIG1A 457 can contain one two-bit field, which allows for four possible values of B. For example, the values of B can be 5, 10, 15, or 20 MHz, corresponding to values of 0-3 in the allocation granularity field. In some aspects, a field of k bits can be used to signal the value of B, defining a number from 0 to N, where 0 represents the least flexible option (largest granularity), and a high value of N represents the most flexible option (smallest granularity). Each B MHz portion can be referred to as a sub-band.

The HE-SIG1A 457 can further use 2 bits per user to indicate the number of sub-bands allocated to each STA. This can allow 0-3 sub-bands to be allocated to each user. The group-id (G_ID) can be used in order to identify the STAs, which can receive data in an OFDMA packet. This 6-bit G_ID can identify up to four STAs, in a particular order, in this example.

The training fields and data which are sent after the HE-SIG symbols can be delivered by the AP according to the allocated tones to each STA. This information can potentially be beamformed. Beamforming this information can have certain advantages, such as allowing for more accurate decoding and/or providing more range than non-beamformed transmissions.

Depending on the space time streams assigned to each user, different users can use a different number of HE-LTFs 465. Each STA can use a number of HE-LTFs 465 that allows channel estimation for each spatial stream associated with that STA, which can be generally equal to or more than the number of spatial streams. LTFs can also be used for frequency offset estimation and time synchronization. Because different STAs can receive a different number of HE-LTFs, symbols can be transmitted from the AP 104 (FIG. 1) that contain HE-LTF information on some tones and data on other tones.

In some aspects, sending both HE-LTF information and data on the same OFDM symbol can be problematic. For example, this can increase the peak-to-average power ratio (PAPR) to too high a level. Thus, it can be beneficial to instead to transmit HE-LTFs 465 on all tones of the transmitted symbols until each STA has received at least the required number of HE-LTFs 465. For example, each STA can need to receive one HE-LTF 465 per spatial stream associated with the STA. Thus, the AP can be configured to transmit a number of HE-LTFs 465 to each STA equal to the largest number of spatial streams assigned to any STA. For example, if three STAs are assigned a single spatial stream, but the fourth STA is assigned three spatial streams, in this aspect, the AP can be configured to transmit four symbols of HE-LTF information to each of the four STAs before transmitting symbols containing payload data.

It is not necessary that the tones assigned to any given STA be adjacent. For example, in some implementations, the sub-bands of the different receiving STAs can be interleaved. For example, if each of user-1 and user-2 receive three sub-bands, while user-4 receives two sub-bands, these sub-bands can be interleaved across the entire AP bandwidth. For example, these sub-bands can be interleaved in an order such as 1,2,4,1,2,4,1,2. In some aspects, other methods of interleaving the sub-bands can also be used. In some aspects, interleaving the sub-bands can reduce the negative effects of interferences or the effect of poor reception from a particular device on a particular sub-band. In some aspects, the AP can transmit to STAs on the sub-bands that the STA prefers. For example, certain STAs can have better reception in some sub-bands than in others. The AP can thus transmit to the STAs based at least in part on which sub-bands the STA can have better reception. In some aspects, the sub-bands can also not be interleaved. For example, the sub-bands can instead be transmitted as 1,1,1,2,2,2,4,4. In some aspects, it can be pre-defined whether or not the sub-bands are interleaved.

In the example of FIG. 7, HE-SIG0 455 symbol modulation can be used to signal HE devices that the packet is an HE packet. Other methods of signaling HE devices that the packet is an HE packet can also be used. In the example of FIG. 7, the L-SIG 426 can contain information that instructs HE devices that an HE preamble can follow the legacy preamble. For example, the L-SIG 426 can contain a low-energy, 1-bit code on the Q-rail which indicates the presence of a subsequent HE preamble to HE devices sensitive to the Q signal during the L-SIG 426. A very low amplitude Q signal can be used because the single bit signal can be spread across all the tones used by the AP to transmit the packet. This code can be used by high efficiency devices to detect the presence of an HE-preamble/packet. The L-SIG 426 detection sensitivity of legacy devices need not be significantly impacted by this low-energy code on the Q-rail. Thus, these devices can be able to read the L-SIG 426, and not notice the presence of the code, while HE devices can be able to detect the presence of the code. In this implementation, all of the HE-SIG fields can be BPSK modulated if desired, and any of the techniques described herein related to legacy compatibility can be used in conjunction with this L-SIG signaling.

In various embodiments, any HE-SIG field 455-459 can contain bits defining user-specific modulation type for each multiplexed user. For example, the optional HE-SIG1B 459 field can contain bits defining user-specific modulation type for each multiplexed user.

In some aspects, wireless signals can be transmitted in a low-rate (LR) mode, for example according the 802.11ax protocol. Particularly, in some embodiments, the AP 104 can have a greater transmit power capability compared to the STAs 106. In some embodiments, for example, the STAs 106 can transmit at several dB lower than the AP 104. Thus, DL communications from the AP 104 to the STAs 106 can have a higher range than UL communications from the STAs 106 to the AP 104. In order to close the link budget, the LR mode can be used. In some embodiments, the LR mode can be used in both DL and UL communications. In other embodiments, the LR mode is only used for UL communications.

In some embodiments, backwards compatibility with a legacy communications system can be provided by prefixing a hidden LR preamble in front of a legacy preamble. In some embodiments, backwards compatibility can be provided by post-fixing an LR preamble after the legacy preamble. In various embodiments, the legacy preamble can be repeated and the LR-SIG simplified or omitted. In various embodiments, the legacy preamble is not used and the LR-SIG is provided.

In some embodiments, the HEW STAs 106 can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 4 ms and a 4× symbol duration can be 16 ms. Thus, in various embodiments, 1× symbols can be referred to herein as legacy symbols and 4× symbols can be referred to as HEW symbols. In other embodiments, different durations are possible.

Figure 8:
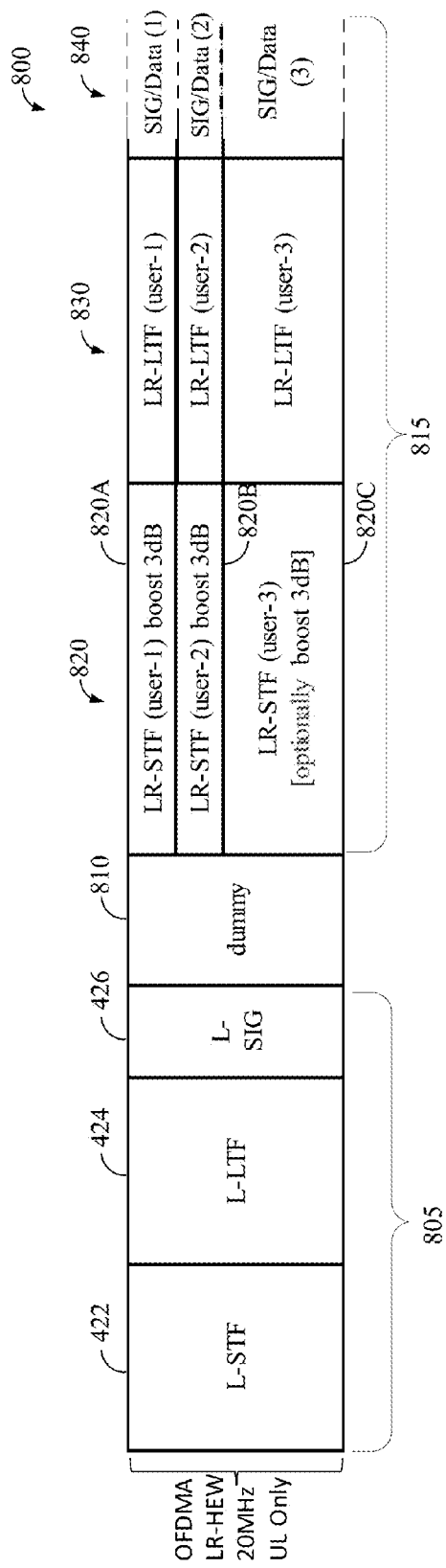
FIG. 8 illustrates an exemplary structure of an uplink physical-layer packet which can be used to enable backward-compatible low rate multiple-access wireless communications.

FIG. 8 illustrates an exemplary structure of an uplink physical-layer packet 800 which can be used to enable backward-compatible low rate multiple-access wireless communications. In this example physical-layer packet 800, a legacy preamble 805 including the L-STF 422, L-LTF 426, and L-SIG 426 are included. In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. A person having ordinary skill in the art can appreciate that the illustrated physical-layer packet 800 can include additional fields, fields can be rearranged, removed, and/or resized, and the contents of the fields varied.

This packet 800 also contains one or more symbols 810 preceding a LR portion 815. In various embodiments, the symbols 810 can have a legacy duration such as, for example, 1× duration. The symbols 810 can be variously referred to as dummy symbols, padding symbols, etc. The symbols 810 can serve to provide symbols of a duration expected by legacy devices such as, for example, 802.11ac or non-LR 802.11ax devices. In various embodiments, the symbols 810 can be 8 μs in length. In other embodiments, the symbols 810 can have other lengths.

The LR portion 815 of the packet 800 can include LR-STFs 820, LR-LTFs 830, and SIG/Data fields 840 for each of one or more OFDMA users. In the illustrated embodiment, three users 1-3 share the bandwidth. In the illustrated embodiment, the LR-STF 820A of user-1 can be boosted by 3 dB, the LR-STF 820B of user-2 can be boosted by 3 dB, and the LR-STF 820C of user-3 can be optionally boosted by 3 dB. In various other embodiments, different boosts, including no boost, can be applied. In some embodiments, the LR-STFs 820 and the LR-LTFs 830 can each be 16 μs in length. In other embodiments, LR-STFs 820 and the LR-LTFs 830 can have other lengths.

Figure 9:
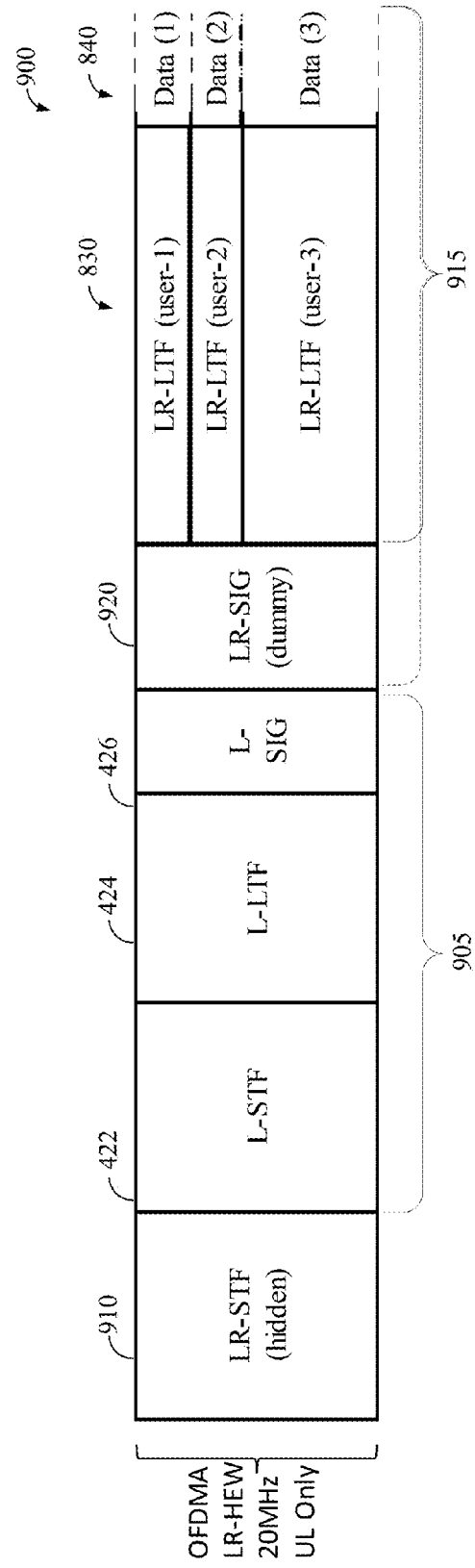
FIG. 9 illustrates another exemplary structure of an uplink physical-layer packet which can be used to enable backward-compatible low rate multiple-access wireless communications.

FIG. 9 illustrates another exemplary structure of an uplink physical-layer packet 900 which can be used to enable backward-compatible low rate multiple-access wireless communications. In this example physical-layer packet 900, a legacy preamble 905 including the L-STF 422, L-LTF 426, and L-SIG 426 are included. In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. A person having ordinary skill in the art can appreciate that the illustrated physical-layer packet 900 can include additional fields, fields can be rearranged, removed, and/or resized, and the contents of the fields varied.

This packet 900 also contains a hidden LR-STF 910 preceding the legacy preamble 905. The hidden LR-STF 910 can be encoded such that legacy devices do not interpret the LR-STF 910 as the beginning of the packet 1000. For example, in some embodiments, the hidden LR-STF 910 can have a different periodicity than the L-STF 422. In various embodiments, the hidden LR-STF 910 can have other parameters or characteristics that cause non-LR devices to ignore or refrain from decoding the LR-STF 910.

After the legacy preamble 905, the packet 900 includes an LR-SIG field 920. In various embodiments, the LR-SIG field 920 can have a legacy duration such as, for example, 1× duration. In some embodiments, the LR-SIG field 920 can be dummy symbols, padding symbols, etc. In various embodiments, the LR-SIG field 920 can each be at least 4 μs in length, for example 8 μs. In other embodiments, the LR-SIG field 920 can have other lengths. In some embodiments, the LR-SIG field 920 can have an LR duration such as, for example, 4× duration. The LR-SIG field 920 can include define modulation characteristics for the LR portion 915.

The LR portion 1015 of the packet 1000 can include the LR-LTFs 830 and Data fields 840 for each of one or more OFDMA users. In the illustrated embodiment, three users 1-3 share the bandwidth. In the illustrated embodiment, the hidden LR-STF 910 can be transmitted across the entire channel bandwidth. In some embodiments, the LR-STFs 910 and the LR-LTFs 830 can each be 16 μs in length. In other embodiments, LR-STFs 910 and the LR-LTFs 830 can have other lengths.

Figure 10:
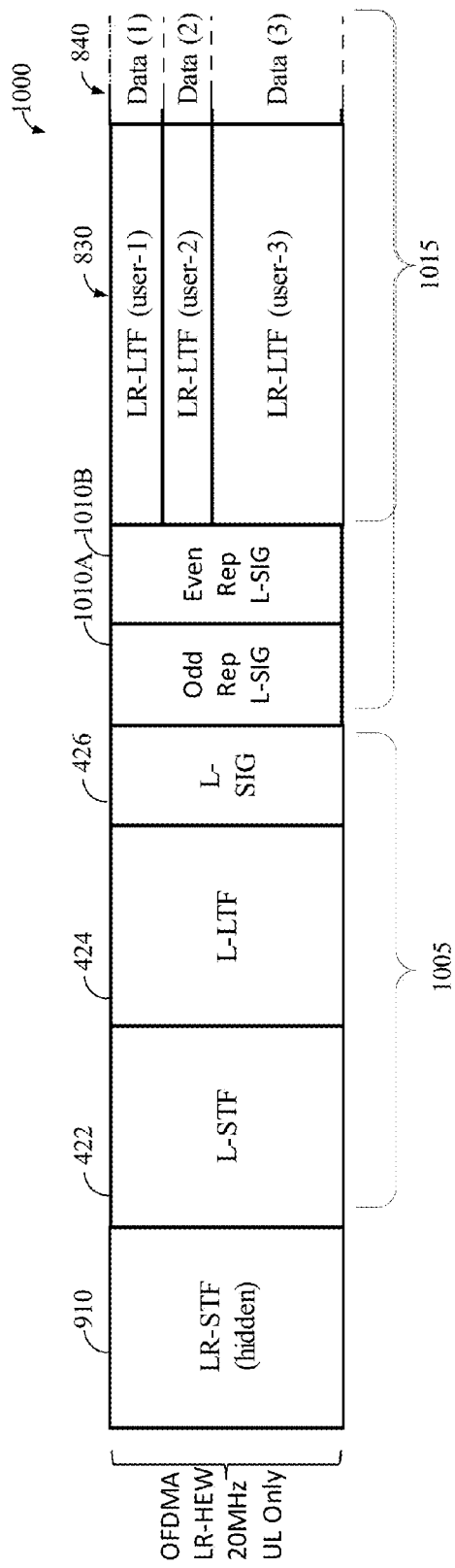
FIG. 10 illustrates another exemplary structure of an uplink physical-layer packet which can be used to enable backward-compatible low rate multiple-access wireless communications.

FIG. 10 illustrates another exemplary structure of an uplink physical-layer packet 1000 which can be used to enable backward-compatible low rate multiple-access wireless communications. In this example physical-layer packet 1000, a legacy preamble 1005 including the L-STF 422, L-LTF 426, and L-SIG 426 are included. In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. A person having ordinary skill in the art can appreciate that the illustrated physical-layer packet 1000 can include additional fields, fields can be rearranged, removed, and/or resized, and the contents of the fields varied.

This packet 1000 also contains a hidden LR-STF 910 preceding the legacy preamble 905. The hidden LR-STF 910 can be encoded such that legacy devices do not interpret the LR-STF 910 as the beginning of the packet 1000. For example, in some embodiments, the hidden LR-STF 910 can have a different periodicity than the L-STF 422. In various embodiments, the hidden LR-STF 910 can have other parameters or characteristics that cause non-LR devices to ignore or refrain from decoding the LR-STF 910.

After the legacy preamble 1005, the packet 1000 repeats the L-SIG 426 in two symbols 1010A-1010B. In particular, the STA 106 can split the L-SIG 426 according to even and odd subcarrier tones. Odd tones of the L-SIG 426 are repeated in a first symbol 1010A. Even tones of the L-SIG 426 are repeated in a second symbol 1010B. In various embodiments, the symbols 1010A-1010B can have a legacy duration such as, for example, 1× duration. In some embodiments, the LR-SIG field 920 can be dummy symbols, padding symbols, etc. In various embodiments, the symbols 1010A-1010B can each be 4 μs in length. In other embodiments, the symbols 1010A-1010B can have other lengths.

The LR portion 1015 of the packet 1000 can include the LR-LTFs 830 and Data fields 840 for each of one or more OFDMA users. In the illustrated embodiment, three users 1-3 share the bandwidth. In the illustrated embodiment, the hidden LR-STF 910 can be transmitted across the entire channel bandwidth. In some embodiments, the LR-STFs 910 and the LR-LTFs 830 can each be 16 μs in length. In other embodiments, LR-STFs 910 and the LR-LTFs 830 can have other lengths.

Figure 11:
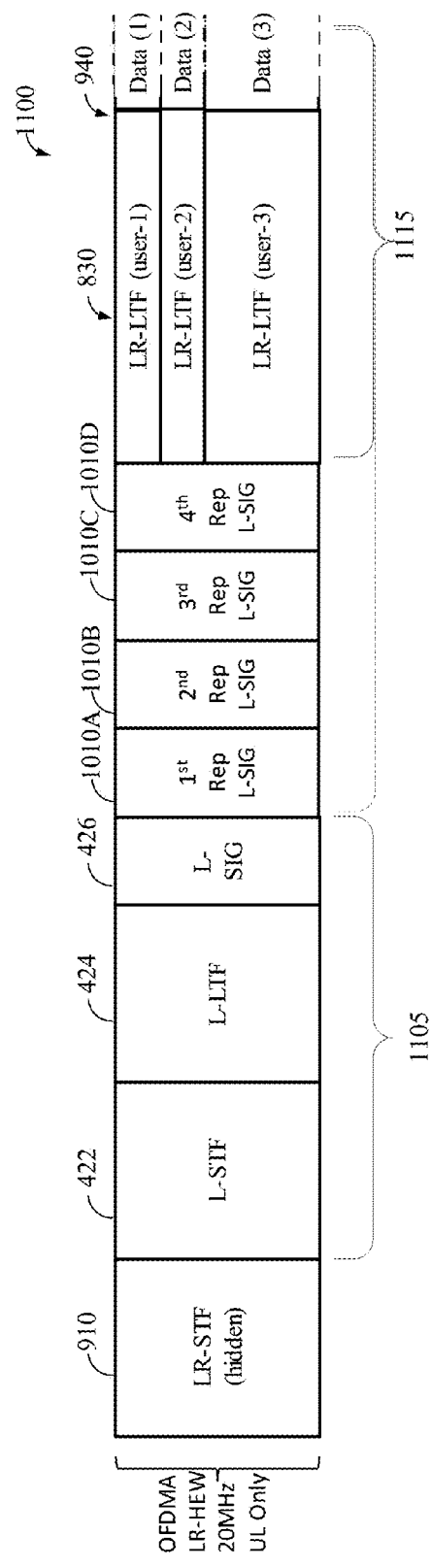
FIG. 11 illustrates another exemplary structure of an uplink physical-layer packet which can be used to enable backward-compatible low rate multiple-access wireless communications.

FIG. 11 illustrates another exemplary structure of an uplink physical-layer packet 1100 which can be used to enable backward-compatible low rate multiple-access wireless communications. In this example physical-layer packet 1100, a legacy preamble 1105 including the L-STF 422, L-LTF 426, and L-SIG 426 are included. In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. A person having ordinary skill in the art can appreciate that the illustrated physical-layer packet 1100 can include additional fields, fields can be rearranged, removed, and/or resized, and the contents of the fields varied.

This packet 1100 also contains a hidden LR-STF 910 preceding the legacy preamble 905. The hidden LR-STF 910 can be encoded such that legacy devices do not interpret the LR-STF 910 as the beginning of the packet 1100. For example, in some embodiments, the hidden LR-STF 910 can have a different periodicity than the L-STF 422. In various embodiments, the hidden LR-STF 910 can have other parameters or characteristics that cause non-LR devices to ignore or refrain from decoding the LR-STF 910.

After the legacy preamble 1105, the packet 1100 repeats the L-SIG 426 in four symbols 1110A-1010D. Although FIGS. 10 and 11 show two and four repetitions of the L-SIG 426, respectively, other numbers of repetition are possible. In an embodiment, the STA 106 can split the L-SIG 426 according to the number of subcarrier tones modulus the number of repetitions. Thus, tones having a modulus of 0 are repeated in a first symbol 1110A, tones having a modulus of 1 are repeated in a second symbol 1110B, tones having a modulus of 2 are repeated in a third symbol 1110C, tones having a modulus of 3 are repeated in a fourth symbol 1110D, and so on. In various embodiments, the symbols 1110A-1010D can have a legacy duration such as, for example, 1× duration. In some embodiments, the LR-SIG field 920 can be dummy symbols, padding symbols, etc. In various embodiments, the symbols 1110A-1010B can each be 4 μs in length. In other embodiments, the symbols 1110A-1010B can have other lengths.

The LR portion 1115 of the packet 1100 can include the LR-LTFs 830 and Data fields 840 for each of one or more OFDMA users. In the illustrated embodiment, three users 1-3 share the bandwidth. In the illustrated embodiment, the hidden LR-STF 910 can be transmitted across the entire channel bandwidth. In some embodiments, the LR-STFs 910 and the LR-LTFs 830 can each be 16 μs in length. In other embodiments, LR-STFs 910 and the LR-LTFs 830 can have other lengths.

In various embodiments, the STA 106 can encode LR-SIG information in a polarity of repeated symbols. For example, to encode a 1, the STA 106 can multiply the repeated bits in the symbol 1010A by −1, to encode a 0, the STA 106 can multiply the repeated bits in the symbol 1010B by 1, and so on. In various embodiments, positive and negative repetition polarities can represent 0 and 1, respectively. In other embodiments, different encodings are possible. Note that information bit [0, 1] become modulation bit [1, −1] in one embodiment. Changing the polarity of a symbol means multiply it with +−1 instead of [0, 1].

In various embodiments, the hidden LR-STF 910 can be longer than the L-STF 424. For example, the hidden LR-STF 910 can be sufficiently long for detection by HEW devices at a reduced SNR. In some embodiments, the STAs 106 can flip the sign of one or more samples of every other hidden LR-STF 910 short, which can also be referred to herein as a period in the STF sequence. For example, in some embodiments with a period P=4, the STAs 106 can flip the sign of hidden LR-STF 910 samples as follows: ++++, +−−+, ++++, +−−+, ++++, +−−+, etc. In various embodiments, the STA 106 can choose a flipping pattern sufficient to reduce or minimize an output of a period-P auto-correlator. For example, an exemplary flipping pattern can include [1,−1,1,−1,−1,1,−1,1,−1,1,−1,1,1,−1,1,−1] for 20 MHz, and alternating [1,−1] for higher BW. The foregoing examples are for purposes of illustration. A person having ordinary skill in the art will appreciate that the foregoing examples can be applied to other periods, for example periods P>4.

One advantageous effect of such alternating samples based on the periodicity of 2 shorts, according to one embodiment, is that the PAPR does not change. Another advantageous effect, according to one embodiment, is that that the hardware processing design can be reused (with a doubling of the periodicity). Thus, design and debugging effort can be reduced with a relatively small increase in hardware block size.

Figure 12:
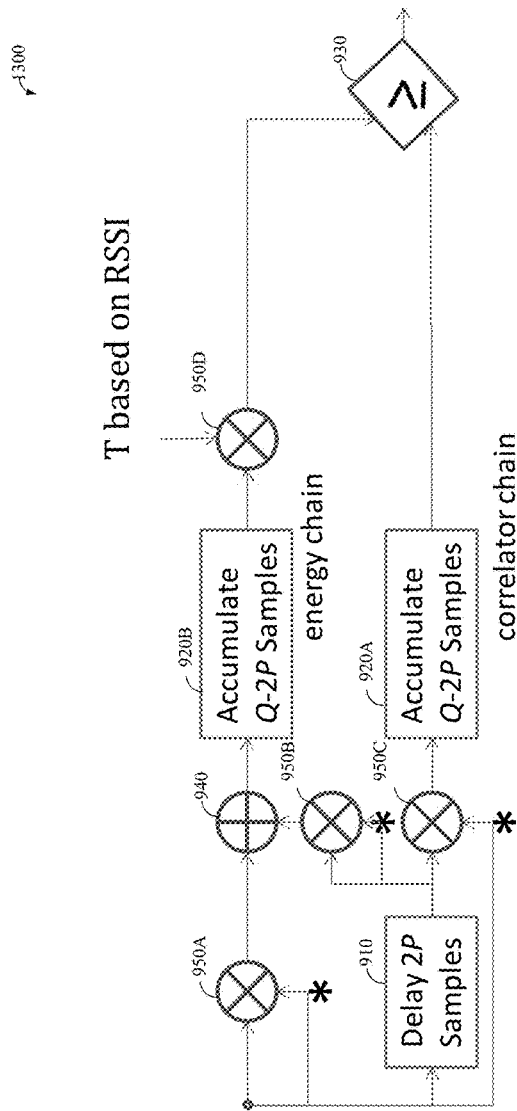
FIG. 12 shows an example detector that can be used to detect a hidden low rate short training field.

FIG. 12 shows an example detector 1300 that can be used to detect a hidden low rate short training field. For example, the detector 1300 can be implemented at the STAs 106 and/or the AP 104 to detect the hidden LR-STF 910. The illustrated detector 1300 includes a delay 910, accumulators 920A-920B, a comparator 930, a combiner 940, and mixers 950A-950D. As shown, the delay 910 has length 2P, and the accumulators 920A-920B each have length Q-2P.

Figure 13:
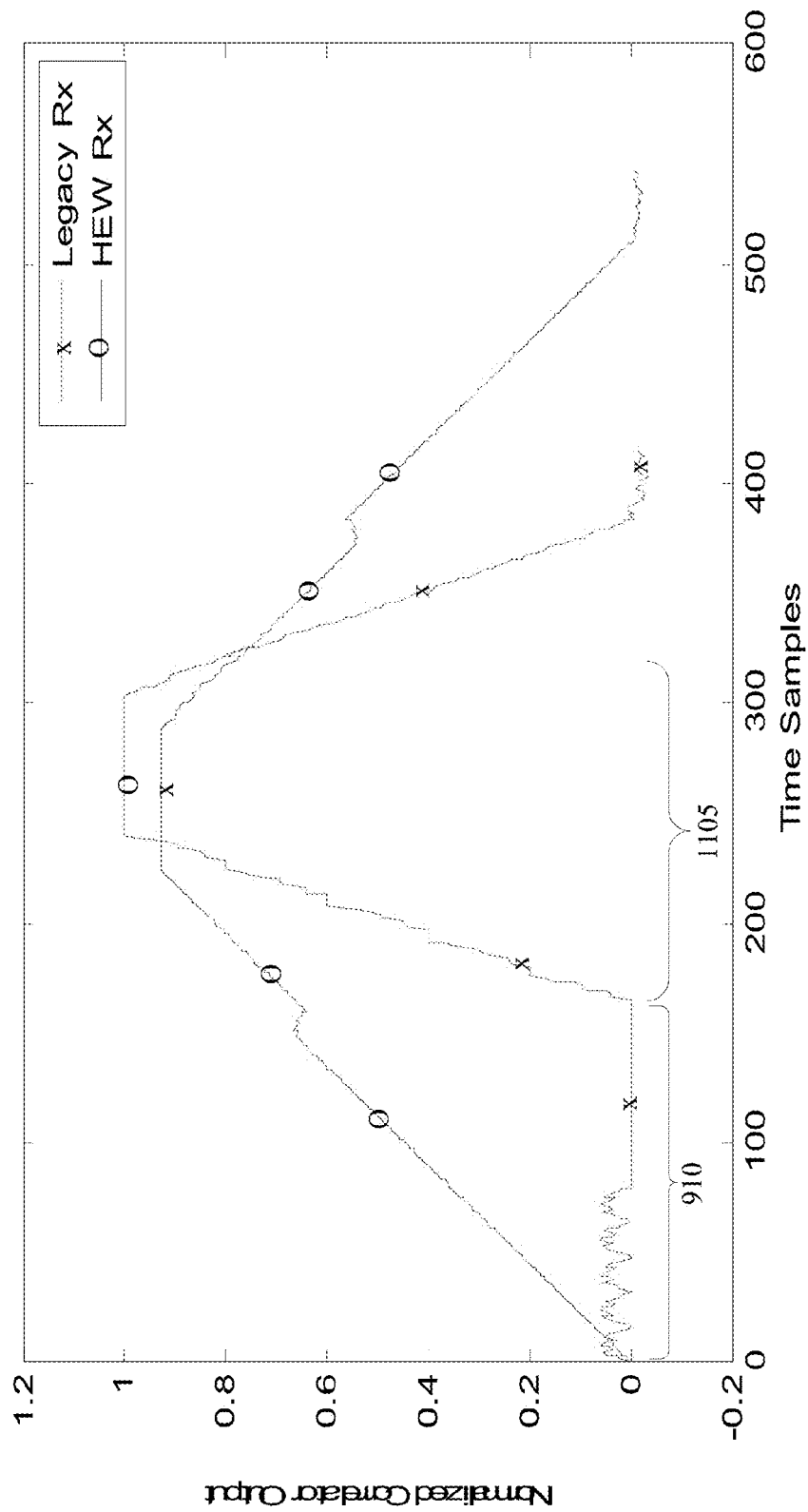
FIG. 13 shows example normalized correlator output over time for both legacy and high-efficiency wireless receivers.

FIG. 13 shows example normalized correlator output over time for both legacy and high-efficiency wireless receivers. As shown, a legacy device and HEW device both receive a HEW packet, such as the packet 1100 of FIG. 11. The HEW device will continue to accumulate during the hidden LR-STF 910, thus starting detection of the LR packet 1100 earlier. On the other hand, the legacy device will only begin to accumulate during the L-STF 1105, thus starting detection of the packet later.

Figure 14:
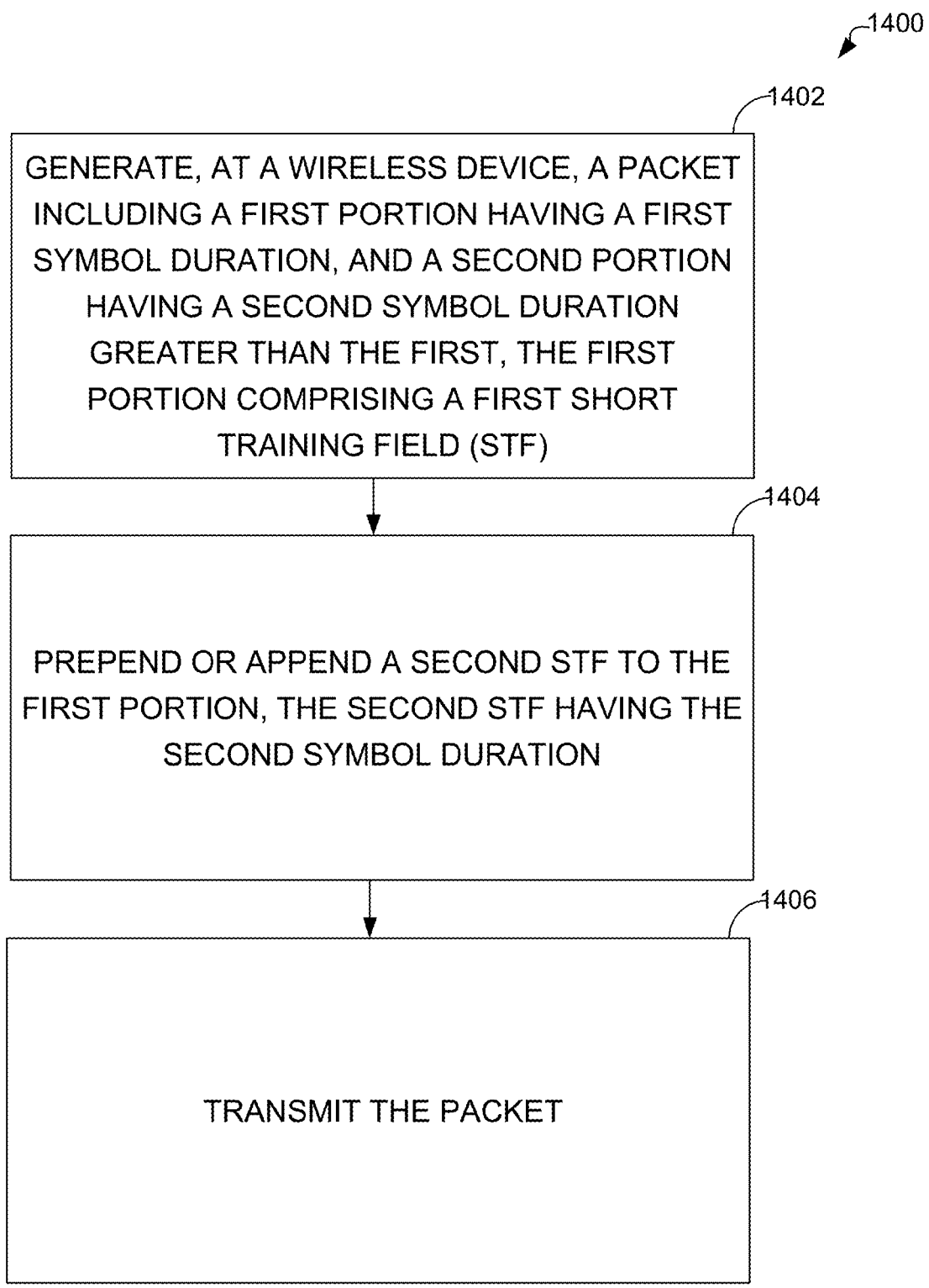
FIG. 14 shows another flowchart for an exemplary method of wireless communication that can be employed within the wireless communication system of FIG. 1.

FIG. 14 shows another flowchart 1400 for an exemplary method of wireless communication that can be employed within the wireless communication system 140 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1 and the packets 800, 900, 1000, and 1100 discussed above with respect to FIGS. 8-11, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1402, a wireless device generates a packet including a first portion having a first symbol duration. The packet further includes a second portion having a second symbol duration greater than the first. The first portion includes a first short training field (STF).

For example, the STA 106 can generate the packet 1100 of FIG. 11 for transmission to the AP 104. The packet 1100 includes the legacy portion 1105, which can be a first portion. The legacy portion 1105 can have a 1× symbol duration, which can be the first symbol duration.

The packet 1100 further includes the LR portion 1115, which can be the second portion. The LR portion 1115 can have a 4× symbol duration, which can be the second symbol duration. The legacy portion 1105 can include the L-STF 422, which can be the first STF.

Next, at block 1404, the device prepends or appends a second STF to the first portion. The second STF has the second symbol duration. For example, the STA 106 can prepend the LR-STF 910, which can be the second STF, to the legacy portion 1105. As another example, the STA 106 can append the LR-STF 820A, which can be the second STF, to the legacy portion 805.

Although various fields are described herein as prepending (adding to the front) an/or appending (adding to the back), in some embodiments, appended fields can be created first, with subsequent fields prepended thereto, prepended fields can be created first, with subsequent fields appended thereto, fields can be created simultaneously or substantially concurrently, or fields can be created in any other order within the scope of this disclosure. In some embodiments, appending/prepending can occur sequentially. In some embodiments, appended/prepended fields are directly appended/prepended and in other embodiments, intervening fields can be contemporaneously, subsequently, or otherwise inserted between the appended/prepended fields.

In various embodiments, said prepending or appending can include prepending the second STF to the first portion. The second STF can have a periodicity different than a periodicity of the first STF. In various embodiments, the method can further include inverting a sign of one or more samples of every other multiple of periodicity for the second STF.

In various embodiments, the second training field can have a periodicity at least two times the periodicity of the first training field. In some embodiments, the device can flip signs of some samples in every other cycle. In some embodiments, the device can flip signs of every cycle in certain manner. In some embodiments, the device can generate a sequence that has tripled periodicity. In some embodiments, the device can generate a totally different sequence, not based on flipping signs of existing legacy STF sequence.

In various embodiments, the packet can further include a signal field after the first portion, the signal field having the second symbol duration. In various embodiments, the packet can further include a one or more symbols after the first portion. The symbols can have the first symbol duration.

In various embodiments, the first portion can include a signal field. The second portion can include a plurality of repeated portions of the signal field. The repeated portions can have the second symbol duration. In various embodiments, n repeated portions of the signal field can each include a subset of carrier tones of the signal field. For example, n repeated portions of the signal field can include every nth subcarrier tone of the signal field. For example, the STA 106 can repeat the L-SIG 426 one or more times including the repetitions 1010A-1010D.

In various embodiments, said prepending or appending can include appending one or more symbols having the first symbol duration to the first portion, boosting a gain of the second STF, and appending the second STF to the one or more symbols. For example, the STA 106 can optionally boost the gain of the LR-STF 820.

Then, at block 1406, the wireless device transmits the packet. For example, the STA 106 can transmit the packet 1100 to the AP 104. In various embodiments, the packet can include a scheduled multi-user (MU) orthogonal frequency division multiple access (OFDMA) uplink (UL) packet. In various embodiments, the packet initiates an unscheduled single-user (SU) orthogonal frequency division multiple access (OFDMA) uplink (UL) packet.

In an embodiment, the method shown in FIG. 14 can be implemented in a wireless device that can include a generating circuit, a prepending/appending circuit, and a transmitting circuit. Those skilled in the art will appreciate that a wireless device can have more components than the simplified wireless device described herein. The wireless device described herein includes only those components useful for describing some prominent features of implementations within the scope of the claims.

The generating circuit can be configured to generate the packet. In some embodiments, the generating circuit can be configured to perform at least block 1402 of FIG. 14. The generating circuit can include one or more of the processor 204 (FIG. 2), the memory 206 (FIG. 2), and the DSP 220 (FIG. 2). In some implementations, means for generating can include the generating circuit.

The prepending/appending circuit can be configured to prepend and/or append the second STF. In some embodiments, the prepending/appending circuit can be configured to perform at least block 1404 of FIG. 14. The prepending/appending circuit can include one or more of the processor 204 (FIG. 2), the memory 206 (FIG. 2), and the DSP 220 (FIG. 2). In some implementations, means for prepending/appending can include the prepending/appending circuit.

The transmitting circuit can be configured to transmit the first and second messages together. In some embodiments, the transmitting circuit can be configured to perform at least block 1406 of FIG. 14. The transmitting circuit can include one or more of the transmitter 210 (FIG. 2), the antenna 216 (FIG. 2), and the transceiver 214 (FIG. 2). In some implementations, means for transmitting can include the transmitting circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above can also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it can be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of wireless communication, comprising:
   determining, by a wireless device, a first portion comprising a first training field and having a first symbol duration, and a second portion having a second symbol duration greater than the first symbol duration;
   generating, by the wireless device, a packet comprising the first portion and the second portion, the second portion comprising a second training field having the second symbol duration and a periodicity at least two times a periodicity of the first training field; and
   transmitting, by the wireless device to a different wireless device, the packet.

2. The method of claim 1, wherein the packet further comprises a signal field after the first portion, the signal field having the second symbol duration.

3. The method of claim 1, wherein the packet further comprises one or more symbols after the first portion, the symbols having the first symbol duration.

4. The method of claim 1, wherein:
   the first portion comprises a signal field, and
   the second portion comprises a plurality of repeated portions of the signal field, the repeated portions having the second symbol duration.

5. The method of claim 4, wherein the plurality of repeated portions comprises a subset of carrier tones of the signal field.

6. The method of claim 1, the method further comprising:
appending one or more symbols having the first symbol duration to the first portion;
boosting a gain of the second training field; and
appending the second training field to the one or more symbols.

7. The method of claim 1, wherein the packet comprises a scheduled multi-user (MU) orthogonal frequency division multiple access (OFDMA) uplink (UL) packet.

8. The method of claim 1, wherein the packet initiates an unscheduled single-user (SU) orthogonal frequency division multiple access (OFDMA) uplink (UL) packet.

9. The method of claim 1, further comprising generating the second training field such that a receiving device's autocorrelation of the second training field, at the periodicity of the second training field, generates an output that hides the second training field from the receiving device.

10. The method of claim 9, further comprising generating the second training field such that a normalized output of the autocorrelation at the receiver is substantially zero.

11. The method of claim 1, further comprising flipping a polarity of every other second training field short.

12. The method of claim 11, further comprising generating the second training field as a low rate short training field (LR-STF).

13. An apparatus of wireless communication, comprising:
a hardware processor configured to:
determine a first portion comprising a first training field and having a first symbol duration, and a second portion having a second symbol duration greater than the first symbol duration; and
generate a packet comprising the first portion and the second portion, the second portion comprising a second training field having the second symbol duration and a periodicity at least two times a periodicity of the first training field; and
a transmitter configured to transmit the packet to a different apparatus.

14. The apparatus of claim 13, wherein the packet further comprises a signal field after the first portion, the signal field having the second symbol duration.

15. The apparatus of claim 13, wherein the packet further comprises one or more symbols after the first portion, the symbols having the first symbol duration.

16. The apparatus of claim 13, wherein:
the first portion comprises a signal field, and
the second portion comprises a plurality of repeated portions of the signal field, the repeated portions having the second symbol duration.

17. The apparatus of claim 16, wherein the plurality of repeated portions comprises a subset of carrier tones of the signal field.

18. The apparatus of claim 13, wherein the hardware processor is configured to:
append one or more symbols having the first symbol duration to the first portion;
boost a gain of the second training field; and
append the second training field to the one or more symbols.

19. The apparatus of claim 13, wherein the packet comprises a scheduled multi-user (MU) orthogonal frequency division multiple access (OFDMA) uplink (UL) packet.

20. The apparatus of claim 13, wherein the packet initiates an unscheduled single-user (SU) orthogonal frequency division multiple access (OFDMA) uplink (UL) packet.

21. The apparatus of claim 13, wherein the hardware processor is further configured to generate the second training field such that a receiving device's autocorrelation of the second training field, at the periodicity of the second training field, generates an output that hides the second training field from the receiving device.

22. The apparatus of claim 21, wherein a normalized output of the autocorrelation is substantially zero.

23. The apparatus of claim 13, wherein the hardware processor is further configured to flip a polarity of every other second training field short.

24. The apparatus of claim 23, wherein the hardware processor is further configured to generate the second training field as a low rate short training field (LR-STF).

25. An apparatus of wireless communication, comprising:
means for determining a first portion comprising a first training field and having a first symbol duration, and a second portion having a second symbol duration greater than the first symbol duration;
means for generating a packet comprising the first portion and the second portion, the second portion comprising a second training field having the second symbol duration and a periodicity at least two times a periodicity of the first training field; and
means for transmitting, by the apparatus to a different apparatus, the packet.

26. The apparatus of claim 25, wherein the packet further comprises a signal field after the first portion, the signal field having the second symbol duration.

27. The apparatus of claim 25, wherein the packet further comprises one or more symbols after the first portion, the symbols having the first symbol duration.

28. The apparatus of claim 25, wherein:
the first portion comprises a signal field, and
the second portion comprises a plurality of repeated portions of the signal field, the repeated portions having the second symbol duration.

29. The apparatus of claim 28, wherein the plurality of repeated portions comprises a subset of carrier tones of the signal field.

30. The apparatus of claim 25, wherein the packet comprises a scheduled multi-user (MU) orthogonal frequency division multiple access (OFDMA) uplink (UL) packet.

31. A non-transitory computer-readable medium comprising code that, when executed, causes an apparatus to:
determine a first portion comprising a first training field and having a first symbol duration, and a second portion having a second symbol duration greater than the first symbol duration;
generate a packet comprising the first portion and the second portion, the second portion comprising a second training field having the second symbol duration and a periodicity at least two times a periodicity of the first training field; and
transmit the packet to a different apparatus.

32. The non-transitory computer-readable medium of claim 31, further comprising generating the second training field such that a receiving device's autocorrelation of the second training field, at the periodicity of the second training field, generates an output that hides the second training field from the receiving device.

33. The non-transitory computer-readable medium of claim 32, further comprising code that, when executed, causes the apparatus to generate the second training field such that a normalized output of the autocorrelation is substantially zero.

34. The non-transitory computer-readable medium of claim 31, further comprising code that, when executed, causes the apparatus to flip a polarity of every other second training field short.

35. The non-transitory computer-readable medium of claim 34, further comprising code that, when executed, causes the apparatus to generate the second training field as a low rate short training field (LR-STF).

* * * * *